United States Patent

Donal et al.

Patent Number: 5,975,465
Date of Patent: Nov. 2, 1999

[54] ASYMMETRICAL, ONE-PIECE, HOLLOW METAL STRUCTURE SUCH AS A TRAILING EDGE OF AN AIRCRAFT WING LEADING EDGE SLAT AND ITS PRODUCTION PROCESS

[75] Inventors: Valérie Donal, Rueil Nalnaison; Joël René Andre, Bougival; Jacques Bouriquet, Colonnes, all of France

[73] Assignee: Aerospatiale Societe National Industrielle, France

[21] Appl. No.: 08/849,694

[22] PCT Filed: Oct. 11, 1996

[86] PCT No.: PCT/FR96/01594

§ 371 Date: Jul. 1, 1997

§ 102(e) Date: Jul. 1, 1997

[87] PCT Pub. No.: WO97/13683

PCT Pub. Date: Apr. 17, 1997

[30] Foreign Application Priority Data

Oct. 12, 1995 [FR] France .................................. 95 11975

[51] Int. Cl.[6] ...................................................... B64C 3/20
[52] U.S. Cl. ............................................ 244/123; 244/119
[58] Field of Search ...................................... 244/123, 119, 244/124; 416/233

[56] References Cited

U.S. PATENT DOCUMENTS

| 1,380,431 | 6/1921 | Smith . |
| 1,808,842 | 6/1931 | Fedor . |
| 2,097,599 | 11/1937 | Pavlecka . |
| 2,248,221 | 7/1941 | Dornier . |
| 2,372,510 | 3/1945 | Mitchell . |
| 5,534,354 | 7/1996 | Gregg et al. . |
| 5,544,847 | 8/1996 | Bliesner ................................. 744/214 |

*Primary Examiner*—Peter M. Poon
*Assistant Examiner*—Tien Dinh
*Attorney, Agent, or Firm*—Burns, Doane, Swecker & Mathis LLP

[57] ABSTRACT

An asymmetrical, one-piece, hollow metal structure, such as the trailing edge of an aircraft wing leading edge slat comprises two outer skins (16; 18) having different curvatures, interconnected by an edge (20) and moving progressively away from one another. The structure also comprises inner reinforcements defining pairs of cavities (26, 28) separated by a median bulkhead. Manufacture takes place by diffusion welding and superplastic moulding or forming, without opening the tools. In order to take account of the asymmetry, cutouts (40, 42) are made in the skin (18), which is elongated most during forming and the cut parts (44, 46) are joined to the other skin (16).

14 Claims, 5 Drawing Sheets

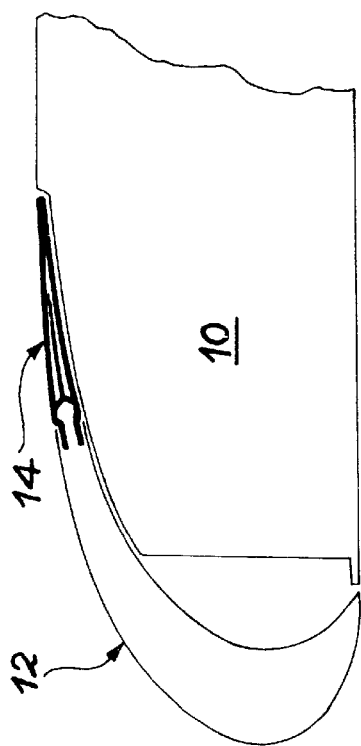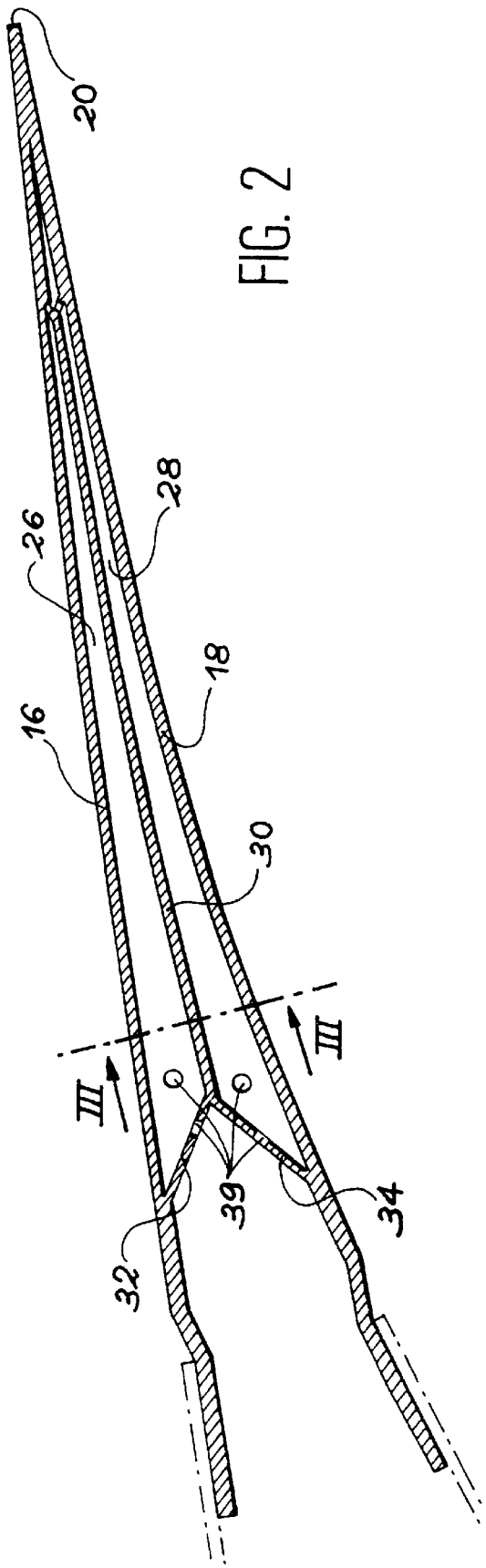

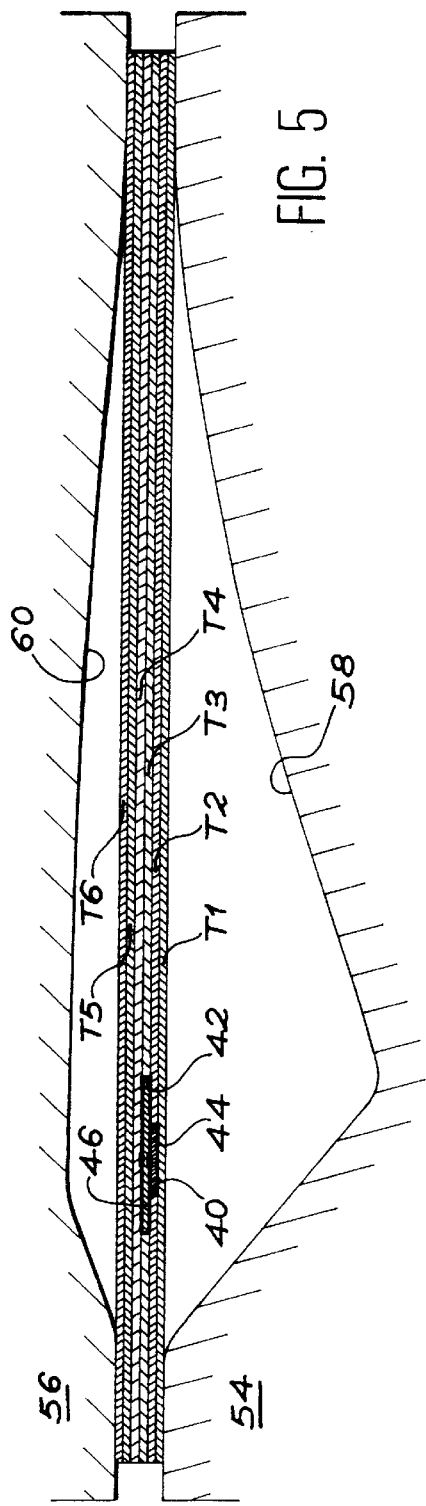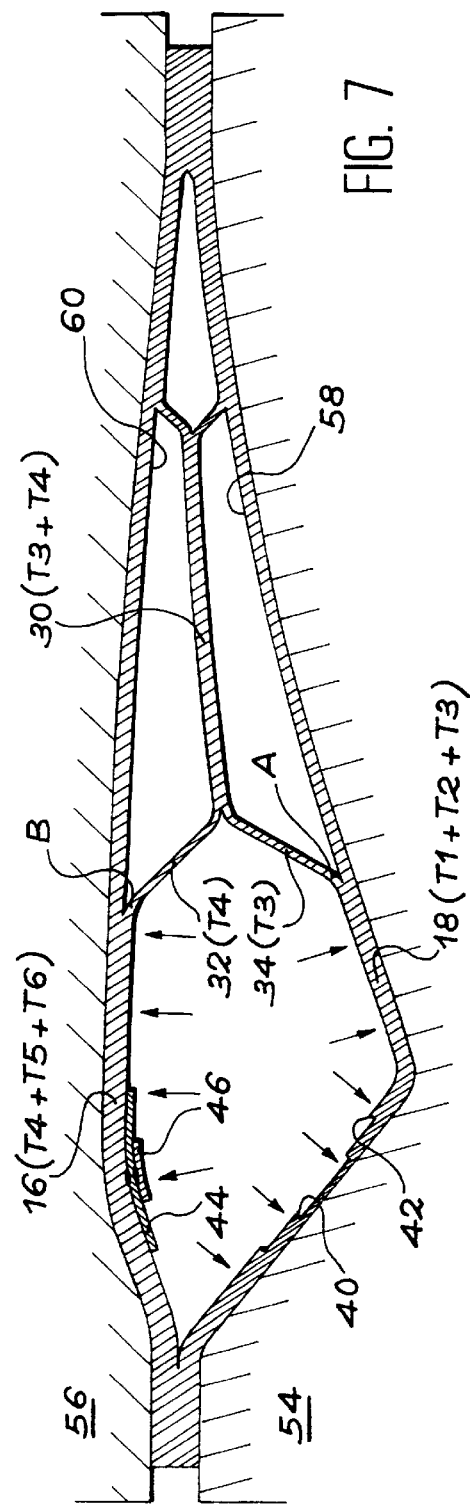

ASYMMETRICAL, ONE-PIECE, HOLLOW METAL STRUCTURE SUCH AS A TRAILING EDGE OF AN AIRCRAFT WING LEADING EDGE SLAT AND ITS PRODUCTION PROCESS

DESCRIPTION

1. Technical Field

The invention mainly relates to a hollow metal structure having outer skins with substantially different curvatures, joined along an edge, as well as inner reinforcements defining cavities between the outer skins.

Such a structure, whose originality is based both on its asymmetry and its one-piece nature, can be advantageously used for forming at least one section of the trailing edge of an aircraft wing leading edge slat.

The invention also relates to a process for manufacturing such an asymmetrical structure by diffusion welding and superplastic forming.

2. Prior Art

On existing aircraft, the trailing edges of wing leading edge slats are manufactured by assembling several parts by bonding and riveting. These parts generally comprise two outer skins for forming the upper surface and inner surface of the trailing edge, an extruded terminal part forming the actual trailing edge, a spar with a U-shaped cross-section for providing the connection between the two outer skins opposite to the trailing edge and a honeycomb filling structure filling the space formed between the aforementioned parts. The outer skins and the terminal part are made from an aluminium alloy. The spar with the U-shaped cross-section is made from a carbon-based composite material. Finally, the honeycomb filling material is generally aluminium.

This description shows that the methods used at present for producing the trailing edges of aircraft leading edge slats are particularly complex and difficult to implement.

Moreover, the superplastic properties of metals such as titanium-based alloys make it possible to manufacture in such materials hollow, one-piece structures by successively carrying out diffusion welding between stacked sheets, followed by a superplastic forming of said sheets.

As is e.g. illustrated by U.S. Pat. No. 5,344,063, this process is generally performed in several stages requiring different tools and it is particularly appropriate for the manufacture of parts having a symmetry with respect to a plane.

As is illustrated by U.S. Pat. No. 4,833,768, it is also known to manufacture by this process asymmetrical structures, whereof the two outer skins are inwardly curved, whilst remaining substantially parallel to one another. In particular, the inwardly curved structure whose manufacture is described in this document has inner reinforcements, whose I-shaped cross-section is perpendicular to the outer skins. In order that there are no excessive displacements in the elongation or extension of the different sheets during superplastic forming, the stack of sheets is progressively inwardly curved during the closing of the forming tools, in order to assume a mean curvature close to the curvature of the structure which it is wished to produce.

In U.S. Pat. No. 4,833,768, to enable the superplastic forming to be carried out under satisfactory conditions, i.e. without any risk of an uncontrolled folding of the sheets, the latter must be tensioned during the closing of the tools, which makes it necessary to add thereto abutments which bear against the tools just prior to complete closure. This procedure suffers from the disadvantage of imposing a welding of the sheets, particularly in areas intended to form inner reinforcements, prior to the putting into place of the stack of sheets in the tooling.

Comparable disadvantages are encountered in U.S. Pat. No. 5,330,092, which proposes manufacturing an asymmetrical, one-piece, hollow metal wing from a stack of sheets by preceding a structure superplastic forming operation in adapted tooling by an operation of welding the different sheets together performed with the aid of a laser, prior to the placing of the structure in the forming tooling.

As is disclosed by U.S. Pat. No. 5,323,536, it is also known to manufacture an asymmetrical, one-piece, hollow metal structure, such as a fan blade from a stack of sheets, by making welds between the sheets by diffusion welding, followed by shaping by superplastic forming. However, the asymmetrical nature of the structure to be produced here again imposes preceding the superplastic forming operation by a prior shaping of the stack of sheets in an appropriate machine. It is then vital that the diffusion welding is performed prior to said shaping of the stack, so that the relative positioning between the sheets is satisfactory during superplastic forming. Like the other asymmetrical structure manufacturing processes, this process consequently suffers from the disadvantage of not permitting the performance of diffusion welding and superplastic forming in the same tooling without the opening thereof.

DESCRIPTION OF THE INVENTION

The first object of the invention is an asymmetrical, one-piece, hollow metal structure which can be manufactured in the same tooling, without opening the latter, by diffusion welding and then superplastic forming.

A second object of the invention is a process for manufacturing such a structure.

According to the invention, the first of these objects is achieved by means of an asymmetrical, one-piece, hollow metal structure, characterized in that it comprises:

two outer skins with substantially differing curvatures connected to one another by an edge and moving progressively away from one another as from said edge and inner reinforcements defining several pairs of closed cavities between the two outer skins, the cavities of each pair being separated by a median bulkhead placed between the two outer skins and defined by connecting bulkheads connecting the median bulkhead to each of the outer skins.

In a preferred embodiment of the invention, each pair of cavities has a plane of symmetry substantially perpendicular to said edge, the planes of symmetry of pairs of cavities being regularly spaced in such a way that the cavities are juxtaposed in the chord direction of said edge. This feature gives the structure a particularly high rigidity.

The cavities are then preferably elongated in their plane of symmetry and have a smaller width in the direction parallel to the edge of the structure.

In this preferred embodiment of the invention, the connecting bulkhead of each cavity is inclined by an angle between approximately 30° and approximately 35°, with respect to the outer skin to which said connecting partition is fastened, so that the cavity has a cross-section parallel to said skin decreasing up to the inner bulkhead.

In their portions outside the cavities, the outer skins advantageously have a greater thickness than in their portions defining the cavities, the median part bulkheads and the connecting bulkheads.

In a preferred application of the invention, the structure constitutes at least one section of the trailing edge of an aircraft wing leading edge slat.

The second object of the invention is achieved by means of a process for manufacturing a one-piece, hollow metal structure, by diffusion welding and superplastic forming, comprising the following stages:

preparation of sheets for forming two outer skins and inner reinforcements of the structure, with a view to defining areas to be welded on the facing surfaces of said sheets, placing the stacked sheets in a welding and forming tooling and closing the tooling by pinching peripheral edges of the sheets, heating and applying a first pressure in the tooling on either side of the stacked sheets in order to perform the diffusion welding thereof, eliminating the first pressure and applying a second pressure between the sheets forming the outer skins and the sheets forming the inner reinforcements, in order to carry out superplastic forming, cooling, opening the tooling and machining the structure obtained, characterized in that, as the structure to be manufactured is asymmetrical and has two outer skins with substantially different curvatures, which are joined along an edge, move progressively away from one another as from said edge and are in each case formed by at least two sheets in regions of the structure free from inner reinforcements, the placing of the stacked sheets in the tooling is preceded by the following stages:

reduction of the thickness of the first sheets for forming the outer skin with the greatest curvature, from the side turned towards the second sheets for forming the outer skin with the smallest curvature, in a region which is to be eliminated by machining following forming, by cutting a part in at least one of the first sheets parallel to the edge of the structure to be manufactured, increasing the thickness of the second sheets by adding said part from the side turned towards the first sheets, so that said part precisely fills said cutout during the placing of the sheets in the tooling.

Preferably, each of the outer skins being formed by at least three sheets in the regions free from reinforcements, cutting then takes place of a part in the two first sheets turned towards the second sheets, the width of the part cut in the first sheet furthest from the second sheets being smaller than that of the part cut in the first sheet closest to the second sheets.

BRIEF DESCRIPTION OF THE DRAWINGS

The invention is described hereinafter relative to a preferred, non-limitative embodiment and relative to the attached drawings, wherein show:

FIG. 1 A cross-sectional view diagrammatically showing the front of an aircraft wing equipped with a leading edge slat.

FIG. 2 A cross-sectional view showing on a larger scale the trailing edge of the leading edge slat of FIG. 1, constituted by an asymmetrical, one-piece, hollow metal structure according to the invention.

FIG. 5 A sectional view illustrating in greater detail the stack of sheets placed in the tooling, according to the manufacturing process according to the invention.

FIG. 7 A sectional view comparable to FIG. 5 showing the form assumed by the part within the tooling at the end of superplastic forming.

DETAILED DESCRIPTION OF AN EMBODIMENT

FIG. 1 very diagrammatically shows the front portion of an aircraft wing 10. The wing 10 is in conventional manner equipped at the front with a leading edge slat 12, which is mounted on the wing 10 by a mechanism permitting a modification of its position, according to the particular flight phase which it is in. For reasons of clarity, this mechanism is not shown in FIG. 1.

The leading edge slat 12 has in conventional manner a rounded leading edge and a tapered trailing edge 14 giving it in cross-section a shape similar to that of a latch or comma.

According to the invention, it is proposed that the trailing edge 14 of the leading edge slat 12 be produced in the form of a one-piece, hollow metal structure. This structure will firstly be described in detail with reference to FIGS. 2 and 3. Its manufacture will be described relative to FIGS. 4 to 8.

Before describing in detail the one-piece, hollow metal structure constituting the trailing edge 14, it is pointed out that the latter can be formed, as a function of the particular case, either by a single structure, or by at least two like structures joined end to end, e.g. by riveting, if the length of the leading edge slat 12 is too great to permit the manufacture of the trailing edge 14 all at once.

Figure 3:
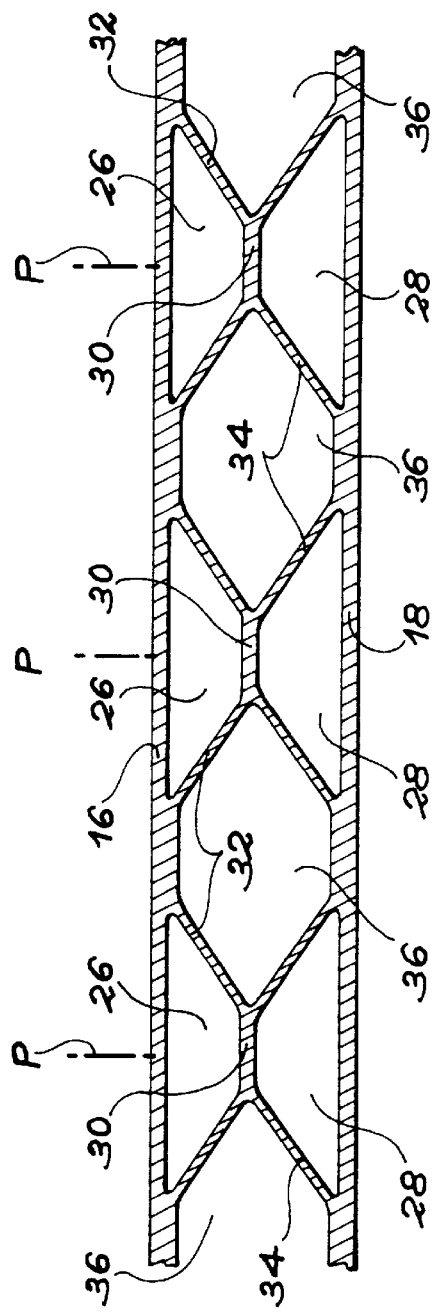
FIG. 3 A section along line III—III of FIG. 2.

As illustrated in FIGS. 2 and 3, the one-piece, hollow metal structure according to the invention is asymmetrical and has two outer skins 16 and 18 of different curvatures, connected to one another by a substantially rectilinear edge 20, constituting the actual trailing edge of the leading edge slat. More specifically, the upper outer skin 16 is convex and has a limited curvature, whereas the lower outer skin 18 is concave and has a more pronounced curvature. The upper outer skin forms the upper surface of the trailing edge 14, whereas the lower outer skin 18 forms its lower surface.

As from the edge 20, the outer skins 16 and 18 move progressively away from one another, so that the structure is open towards the front, in its portion which is to be connected to the structure forming the actual leading edge slat 12.

Apart from the two outer skins 16 and 18, the one-piece, hollow metal structure forming the trailing edge 14 has inner reinforcements defining between them the two skins of pairs of upper 26 and lower 28 cavities closed by bulkheads in all directions. More specifically, each of the upper cavities 26 is formed between the convex outer skin 16 and a median bulkhead 30, positioned substantially equidistantly between the skins 16 and 18 to the right of each of the pairs of cavities 26 and 28. Each lower cavity 28 is formed between the median bulkhead 30 and the concave outer skin 18.

Moreover, each of the cavities 26 is defined at its periphery by a connecting bulkhead 32 connecting the corresponding median bulkhead 30 to the convex outer skin 16 and each of the lower cavities 28 is defined at its periphery by a connecting bulkhead 34 connecting the corresponding median bulkhead 30 to the concave outer skin 18.

Each of the pairs of cavities 26 and 28 has a plane of symmetry P (FIG. 3) substantially perpendicular to the edge 20 and parallel to the plane of FIG. 2. As is more particularly illustrated in FIG. 3, the planes of symmetry of different pairs of cavities 26 and 28 are regularly spaced, so that the cavities are juxtaposed in the chord direction of the edge 20. Moreover, FIG. 2 shows that the cavities 26 and 28 are elongated in their plane of symmetry, so that each of the pairs of cavities 26 and 28 starts in the vicinity of the edge 20 and is extended forwards. The cavities 26 and 28 are provided on most of the length of the trailing edge 24. However, FIG. 3 shows that the cavities 26 and 28 have a reduced width in the chord direction of the edge 20.

Moreover, the connecting bulkheads 32 and 34 are inclined with respect to the outer skins 16 and 18, so that the cross-section of each of the cavities 26 and 28 progressively decreases on passing towards the median bulkhead 30. This inclination of the connecting bulkheads 32 and 34 is such that the angle which they respectively form with the outer skins 16 and 18 to which they are connected is between approximately 30° and approximately 35°. More specifically, the angle formed between these connecting bulkheads 32 and 34 and the outer skins 16 and 18 is substantially equal to 30° at the front and rear of each of the cavities 26 and 28, i.e. in section along the median plane P of said cavities. Moreover, the angle is approximately 35° on the sides of the cavities 26 and 28, i.e. in section along a plane parallel to the edge 20.

The arrangement defined hereinbefore makes it possible to form between each pair of consecutive cavities 26 and 28 an intermediate cavity 36, which is open towards the front and rear and which has in section parallel to the edge 20 a substantially hexagonal shape, as shown in FIG. 3. FIG. 3 also shows that the width of these intermediate cavities 36 level with the median bulkheads 30 is substantially equal to the maximum width of the cavities 26 and 28, respectively level with the convex 16 and concave 18 outer skins. The inner reinforcements formed between the outer cavities 16 and 18 consequently have a substantially X-shaped configuration in a section parallel to the edge 20.

For a reason which will become apparent hereinafter and which results from the manufacture of the structure illustrated in FIGS. 2 and 3, the thickness of the outer skins 16 and 18 in the portions thereof not used for defining the cavities 26 and 28 exceeds the thickness of said skins to the right of the cavities 26 and 28. Moreover, the thickness of the outer skins 16 and 18 outside the cavities 26 and 28 also exceeds the thickness of the median bulkheads 20 and the thickness of the connecting bulkheads 32 and 34.

The metal from which the hollow, one-piece structure is made can be of any type able to undergo superplastic forming. In practice, such a metal is generally a titanium-based alloy, such as alloy TA6V.

With reference to FIGS. 4 to 8, a description will now be given of a process for the production of such a structure successively involving diffusion welding and superplastic forming in the same tooling and without opening the latter.

The performance of this process leads to the desired structure from a stack of sheets. In the described embodiment, this stack has six sheets T1 to T6 (FIG. 5), whereof three (T1 to T3) will form the concave outer skin 18 and whereof three (T4 to T6) will form the convex outer skin 16, in the regions of said skins outside the cavities 26 and 28. At the location of the cavities 26 and 28, the two central sheets T3 and T4 will be separated from one another and welded together to form the median bulkhead 30, as well as each of the connecting bulkheads 32 and 34.

Figure 4:
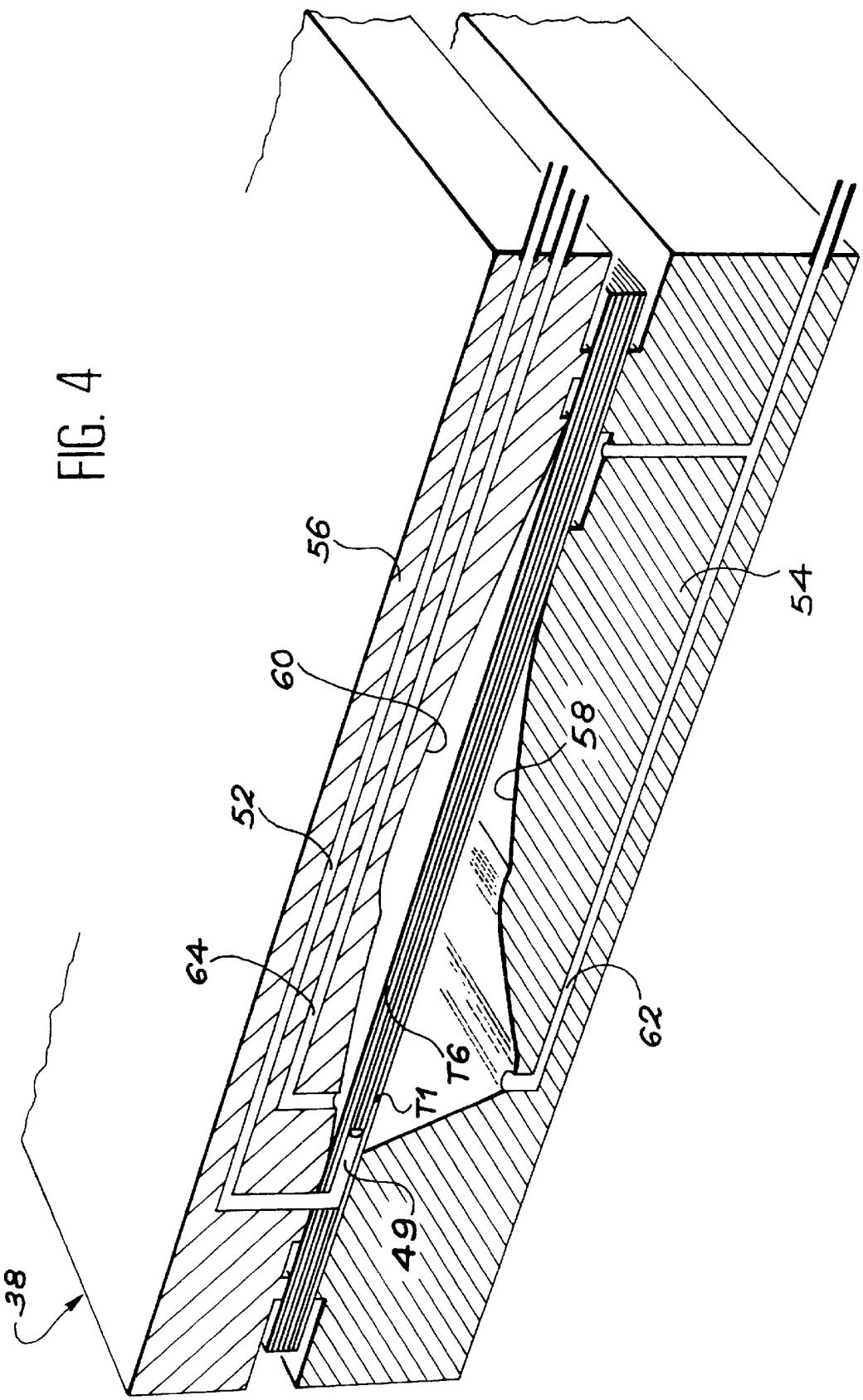
FIG. 4 A perspective, sectional view of tooling in which has been placed a stack of sheets with a view to manufacturing the trailing edge illustrated in FIGS. 2 and 3, by diffusion welding and superplastic forming performed consecutively and without opening the tooling.

Before being placed in the tooling designated by the general reference 38 in FIG. 4, the different sheets T1 to T6 must undergo beforehand a certain number of preparatory operations. These preparatory operations involve operations of a conventional nature for diffusion welding and superplastic forming, as well as original operations according to the invention, aiming at performing these two operations in the same tooling 38 without opening the same, despite the asymmetrical character of the structure to be manufactured.

As a result of the fact that the first series of preparatory operations is of a conventional nature, it will only be described briefly here in order to facilitate understanding. For a more detailed description thereof reference can be made to numerous publications concerning such procedures, such as U.S. Pat. No. 5,323,536.

These known preparatory operations firstly involve machining operations during which cutouts are made in the sheets, e.g. by means of a laser. Apart from the contouring of the sheets, said operations involve the drilling of supply holes 39 (FIG. 2) in regions of the two central sheets T3 and T4 which will form the connecting bulkheads 32 and 34 of the structure. These supply holes will enable pressurized gas to enter the cavities 26 and 28 during superplastic forming.

The known preparatory operations performed on the sheets T1 to T6 prior to their placing in the tooling 38 of FIG. 4 also involve a certain number of operations involving the preparation of the surfaces of the sheets with a view to defining regions of said surfaces in which diffusion welding is to take place. After preparation of the surface of the sheets, e.g. by alkaline degreasing or cleaning, followed by fluonitric pickling, all the surfaces of the sheets are firstly covered with a mask with respect to the immersion in a polyurethane bath protecting the pickled surface from external pollution. The location of the welding areas is then defined by a laser etching of the masks. The areas which are not to be welded are then demasked and then coated with a gun with an anti-diffusant, such as boron nitride. Then the remaining parts of the masks are removed.

According to the invention, these conventional preparatory operations are completed by original complimentary operations for permitting the production of the structure by diffusion welding and then superplastic forming in the tooling 38 without the opening of the latter, despite the asymmetrical shape of the structure which it is wished to produce.

These original operations are performed on portions of the sheets which will be eliminated during the machining performed after forming, in order to obtain the desired structure. More specifically, they relate to those portions of the sheets which, after forming, are located in the extension of the front, open end of the structure 14. Firstly there is a reduction in the thickness of the sheets for forming the concave outer skin 18, beyond the front end of said concave outer skin, by making a rectangular cutout, parallel to the edge 20, in the sheets T2 and T3 facing the sheets T4 to T6 for forming the convex outer skin 16.

Figure 6A:
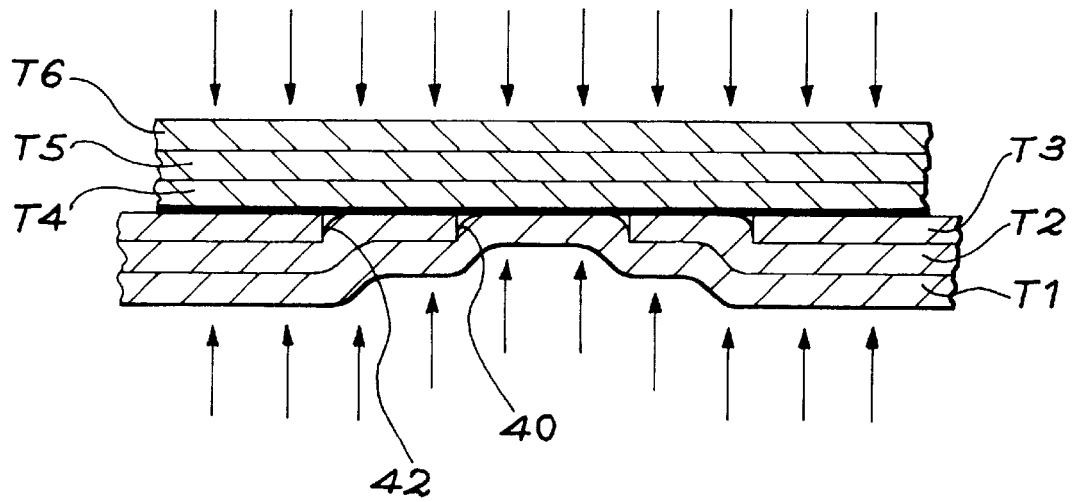
FIG. 6A On a greater scale the configuration of a region of the stack of sheets outside the part to be manufactured, during diffusion welding, if the sheets are not totally prepared according to the invention.
Figure 6B:
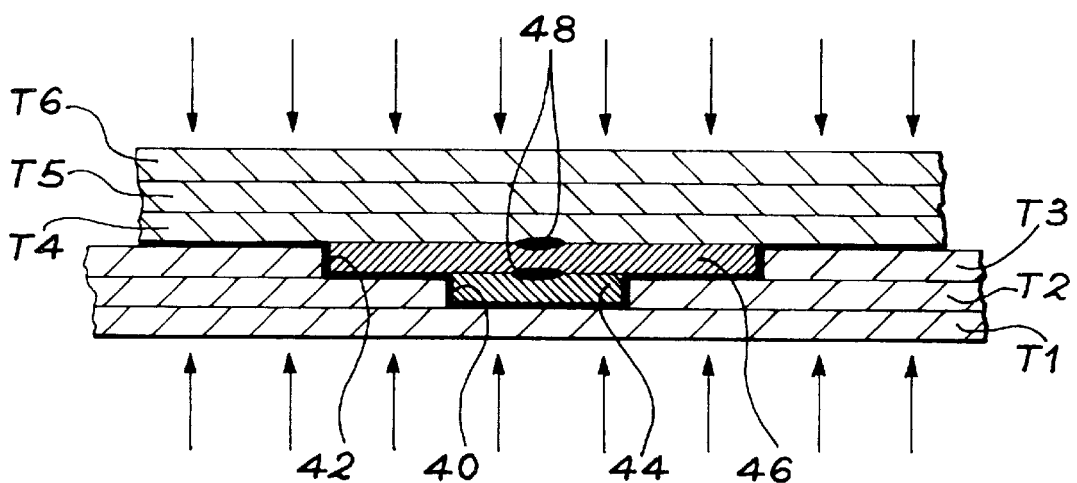
FIG. 6B On a larger scale the configuration assumed by the same region of the stack of sheets when the latter are perfectly prepared according to the invention.

More specifically and as illustrated in FIGS. 5 and 6B, in the intermediate sheet T2 is made a first, relatively narrow, rectangular cutout 40 and in the inner sheet T3 a wider cutout 42.

In addition and as is also illustrated in FIG. 5 and 6B, parts 44 and 46 obtained during the production of the cutouts 40 and 42 respectively in the sheets T2 and T3 are placed on the face of the sheet T4 turned towards the sheet T3, at a location precisely corresponding to the cutouts 40 and 42 formed in the sheets T2 and T3 when the sheets are stacked. Consequently the parts 44 and 46 precisely fill the cutouts 40 and 42, when the sheets Ti to T6 are stacked prior to introduction into the tooling 38.

In order to ensure the maintaining in position of parts 44 and 46, respectively on part 46 and on sheet T4, a few weld spots 48 are made, as illustrated in FIG. 6B.

When all these preparatory operations are at an end, the stack of sheets T1 to T6 is placed in the tooling 38, as is diagrammatically illustrated in FIG. 4. Gas passage needles 46 are then placed in the stack of sheets, between sheets T3 and T4, to permit a gas supply to the different regions of the stack which are to be pressurized during superplastic forming. These needles 50 are connected by channels 52 of the tooling 38 to a not shown, external pressure source.

As illustrated in FIG. 4, the tooling 38 essentially comprises two dies 54 and 56, whose peripheral edges tightly nip or pinch the peripheral edges of the stack of sheets T1 to T6. Within its peripheral edges, each of the dies 54 and 56 has a cross recess 58 and 60. Part of the cross recess 58 defines the shape of the lower surface 24 of the structure to be produced, whereas a part of the cross recess 60 defines the shape of the upper surface 22 of said structure. Each of the dies 54 and 56 also has channels 62 and 64 respectively issuing into the cross recesses 58 and 60 and which can be simultaneously connected to an external pressure source or vented.

When the tooling 38 is closed on the stack of sheets T1 to T6, the temperature is raised close to e.g. 930° C. with the aid of not shown heating means, which can be integrated into the tooling 38 or located outside the same.

When the desired temperature is reached, diffusion welding is performed by applying on either side of the stack of sheets T1 to T6 an adequate pressure to weld the sheets in the areas not covered with an anti-diffusant. This pressure, which can be approximately 8 bars, is ensured by admitting compressed gas into the cross recesses 58 and 60 by passages 62 and 64.

After applying pressure for an adequate time to ensure the diffusion welding of the sheets, e.g. approximately 5 hours, superplastic forming of the structure is performed directly without opening the tooling 38. To this end the pressure applied on either side of the stack of sheets is eliminated, by venting the passages 62 and 64 and then applying by the passages 52 the necessary forming pressure in accordance with a predetermined cycle. The characteristics of the pressure cycle applied by these passages 52 are determined in known manner in accordance with the shapes and dimensions of the structure to be manufactured and as a function of the nature of the superplastic material used. Preferably, the cycle is supervised by a microprocessor controlling the parameters and displaying any defects.

FIG. 5 illustrates the position of the sheets T1 to T6 in the tooling 38 before applying the pressure permitting diffusion welding. FIG. 7 illustrates the state of the structure at the end of superplastic forming.

In the absence of cutouts 40 and 42 in the sheets T2 and T3, tests have shown that the superplastic forming operation led to a tearing of all the connecting bulkheads 34 in their part turned towards the front of the structure to be produced, i.e. towards the left considering FIGS. 2 and 7. This fracture was due to a significant differential elongation of the sheets forming the outer skins 16 and 18 due to the asymmetrical character of the structure to be produced. More specifically, during superplastic forming this asymmetry led to a significantly greater elongation of the three sheets T1 to T3 forming the concave outer skin 18 compared with the elongation of the three sheets T4 to T6 forming the convex outer skin 16. In this case this differential elongation led to a leftward displacement of the area A (FIG. 7) for fastening the front of the connecting bulkhead 34 to the concave outer skin 18 of a significantly greater magnitude than the comparable displacement of the area B for fastening the front of the connecting bulkhead 32 to the convex outer skin 16. The applicant has established that the systematic tearing of the front parts of the connecting bulkheads 34 noted during the aforementioned tests was the direct consequence of this differential displacement.

In order to obviate this disadvantage, it is firstly proposed to make the displacements of the areas A and B for fastening the front parts of the connecting bulkheads 34 and 32 to their respective skins 18 and 16 substantially identical during forming. For this purpose the excess part of the elongation of the three sheets T1 to T3 forming the concave outer skin 18 is localized in a region outside the structure to be produced, i.e. in the portion of said sheets beyond the leading edge of the concave outer skin 18. This result is obtained by means of the cutouts 40 and 42 formed at this location in the sheets T2 and T3.

Forming tests performed according to this principle, but without using the parts 44 and 46 formed during the production of the cutouts 40 and 42 led to relatively unsatisfactory results. Then, during forming, there was a breaking of the sheet T1 to the right of the cutouts 40 and 42.

The applicant has found that this breakage was due to the punching of said sheet T1 during the diffusion welding operation. The punching resulted from the penetration of the sheet T1 into the cutouts 40 and 42, which then occurred under the effect of the pressure applied to the two faces of the stack of sheets during welding. This punching effect is illustrated in FIG. 6A.

To obviate this disadvantage, the applicant decided to fit on the inner face of the sheet T4, the parts 44 and 46, immobilizing them with the aid of weld spots 48, as described hereinbefore in conjunction with FIG. 6B. As a result of this feature, there is no punching when the welding pressure is applied to the stack of sheets during the diffusing welding stage. The subsequent superplastic forming operation then takes place without any breaking of the sheet T1, so that the shaping and elongation of the sheets forming the concave outer skin 18 can be ensured in a perfectly controlled manner. Tests performed under these conditions confirmed that there was no breaking of the connecting bulkheads 34 and that a part in accordance with the structure described hereinbefore with reference to FIGS. 2 and 3 is indeed obtained.

Figure 8:
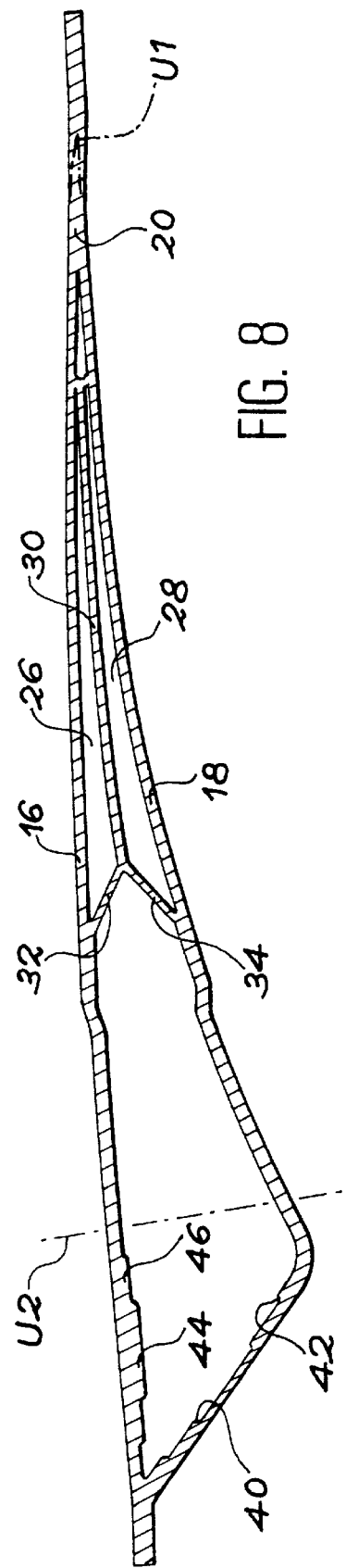
FIG. 8 In cross-section the asymmetrical, one-piece, hollow metal structure obtained by superplastic forming, prior to the machining of said structure for obtaining the trailing edge of FIGS. 2 and 3.

FIG. 8 illustrates the state of the one-piece part obtained after cooling to approximately 700° C. and demoulding. A subsequent machining, e.g. by laser cutting, makes it possible to ensure the contouring of the part obtained in order to give it the precise configuration of the structure illustrated in FIGS. 2 and 3. This machining, illustrated by mixed lines U1 and U2 in FIG. 3, respectively for the trailing edge 20 and the front ends of the skins 16 and 18, also applies to the lateral ends of the structure. It should be noted that this machining operation makes it possible to eliminate the portions of the part obtained after demoulding having the cutouts 40 and 42 and the parts 44 and 46.

Obviously the invention is not limited to the construction of the trailing edge of an aircraft wing leading edge slat and in fact relates to any asymmetrical, hollow metal structure which can be manufacture by diffusion welding and superplastic forming from a stack of sheets.

We claim:

1. Asymmetrical, one-piece, hollow metal structure, comprising:

two outer skins with substantially differing curvatures connected to one another by an edge and diverging progressively away from one another as from said edge and inner reinforcements defining several pairs of closed cavities between the two outer skins, the cavities of each pair being separated by a median bulkhead placed between the two outer skins and defined by connecting bulkheads connecting the median bulkhead to each of the outer skins, wherein the pairs of closed cavities extend in a direction substantially perpendicular to a chord direction of said edge and are juxtaposed in said chord direction, an intermediate cavity being provided between each consecutive pair of closed cavities, said intermediate cavity having a substantially hexagonal shape, in a section parallel to said chord direction.

2. Structure according to claim 1, characterized in that each pair of cavities has a plane of symmetry substantially perpendicular to the edge of the structure, the planes of symmetry of said pairs of cavities being regularly spaced in such a way that the cavities are juxtaposed in the chord direction of said edge.

3. Structure according claim 2, characterized in that the cavities are elongated in their plane of symmetry and have a smaller width in this direction.

4. Structure according to claim 1, characterized in that the connecting bulkhead of each cavity is inclined by an angle between approximately 30° and approximately 35° with respect to the outer skin to which said connecting bulkhead is joined, so that the cavity has a section parallel to said skin decreasing up to the median bulkhead.

5. Structure according to claim 1, characterized in that the outer skins have in their portions outside the cavities a greater thickness than in their portions defining the cavities, the median bulkheads and the connecting bulkheads.

6. Structure according to claim 1, characterized in that the two outer skins comprise a convex skin and a concave skin, the median bulkhead being substantially equidistantly positioned between these two skins.

7. Structure according to claim 1, characterized in that it constitutes at least one section of the trailing edge of a leading edge slat of an aircraft wing.

8. Asymmetrical, one-piece, hollow metal structure, comprising:

two outer skins with substantially differing curvatures connected to one another by an edge and diverging progressively away from one another as from said edge and inner reinforcements defining several pairs of closed cavities between the two outer skins, the cavities of each pair being separated by a median bulkhead placed between the two outer skins and defined by connecting bulkheads connecting the median bulkhead to each of the outer skins, wherein the pairs of closed cavities extend in a direction substantially perpendicular to a chord direction of said edge and are juxtaposed in said chord direction, said inner reinforcements having a substantially X-shaped configuration in a section parallel to said chord direction.

9. Structure according to claim 8 characterized in that each pair of cavities has a plane of symmetry substantially perpendicular to the edge of the structure, the planes of symmetry of said pairs of cavities being regularly spaced in such a way that the cavities are juxtaposed in the chord direction of said edge.

10. Structure according claim 9, characterized in that the cavities are elongated in their plane of symmetry and have a smaller width in this direction.

11. Structure according to claim 8, characterized in that the connecting bulkhead of each cavity is inclined by an angle between approximately 30° and approximately 35° with respect to the outer skin to which said connecting bulkhead is joined, so that the cavity has a section parallel to said skin decreasing up to the median bulkhead.

12. Structure according to claim 8, characterized in that the outer skins have in their portions outside the cavities a greater thickness than in their portions defining the cavities, the median bulkheads and the connecting bulkheads.

13. Structure according to claim 8, characterized in that the two outer skins comprise a convex skin and a concave skin, the median bulkhead being substantially equidistantly positioned between these two skins.

14. Structure according to claim 8, characterized in that it constitutes at least one section of the trailing edge of a leading edge slat of an aircraft wing.

* * * * *